No. 688,407. Patented Dec. 10, 1901.
J. T. & P. F. GLAZIER.
HOSE AND STAND PIPE NOZZLE.
(Application filed Oct. 8, 1900.)
(No Model.) 2 Sheets—Sheet 1.
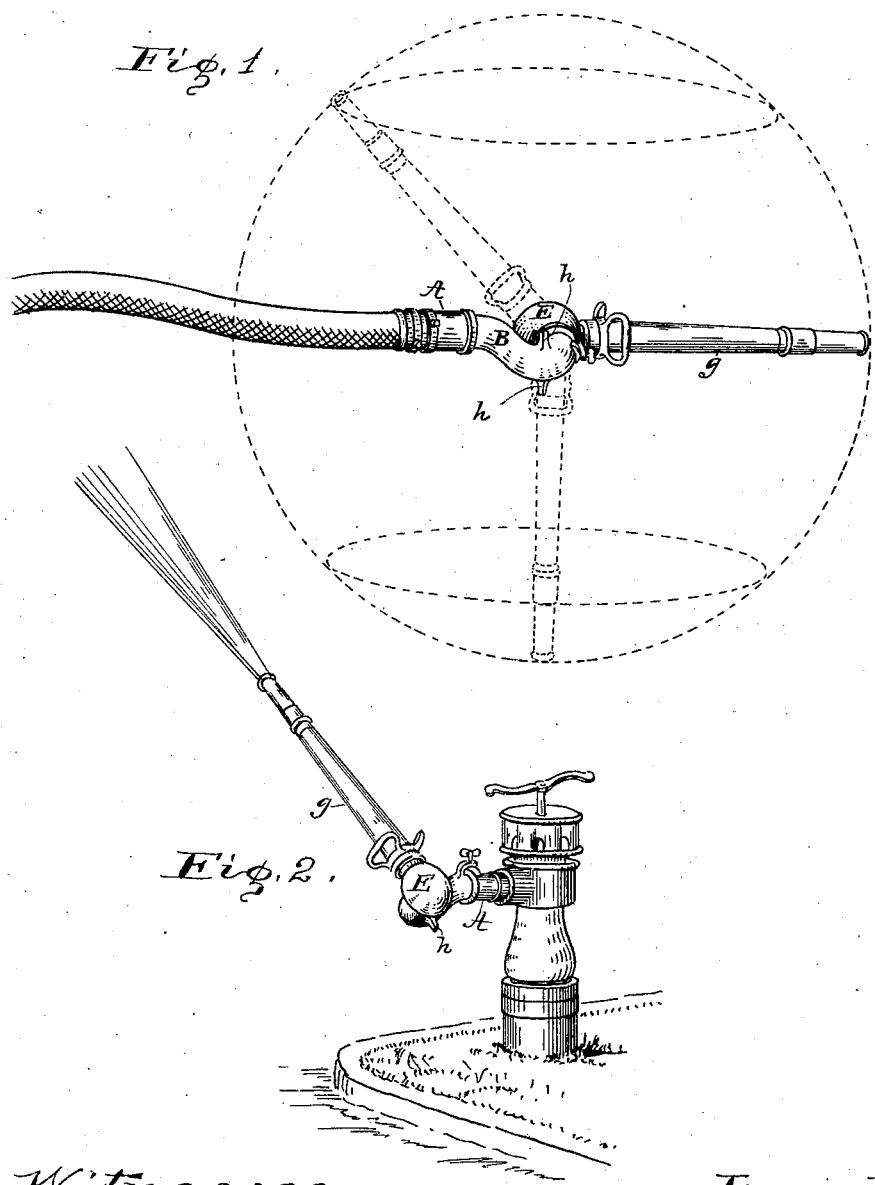
Witnesses,
Charles C. Glazier
S. Mahlon Unger.
Inventors
John T. Glazier and
Peter F. Glazier,
By Joseph A. Minturn
Attorney,
THE NORRIS PETERS CO., PHOTO-LITHO., WASHINGTON, D. C.

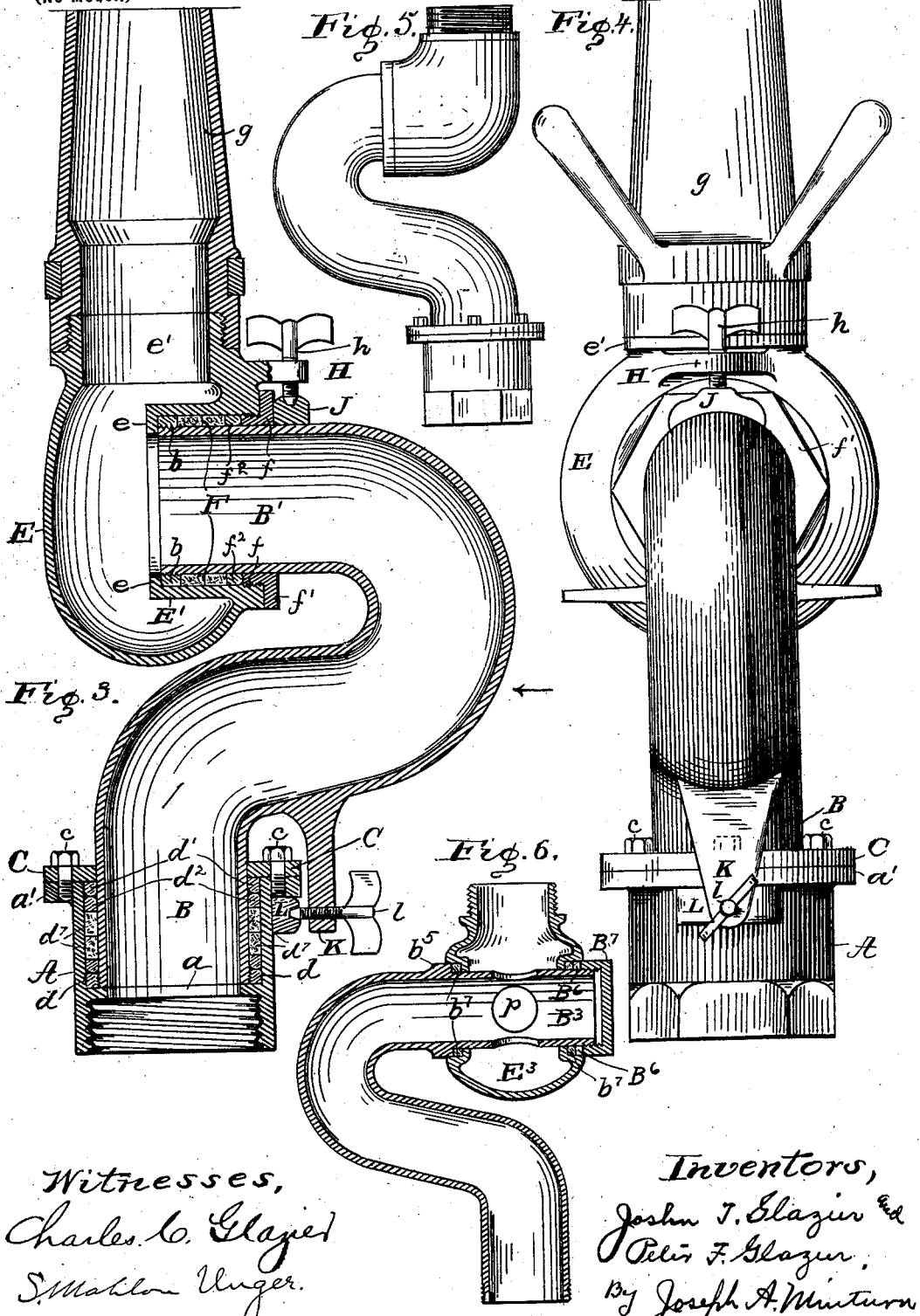

UNITED STATES PATENT OFFICE.

JOHN T. GLAZIER AND PETER F. GLAZIER, OF INDIANAPOLIS, INDIANA.

HOSE AND STAND-PIPE NOZZLE.

SPECIFICATION forming part of Letters Patent No. 688,407, dated December 10, 1901.

Application filed October 8, 1900. Serial No. 32,433. (No model.)

*To all whom it may concern:*

Be it known that we, JOHN T. GLAZIER and PETER F. GLAZIER, citizens of the United States, residing at Indianapolis, in the county of Marion and State of Indiana, have invented certain new and useful Improvements in Hose and Stand-Pipe Nozzles, of which the following is a specification.

This invention is an improvement on the nozzle patented to us August 2, 1898, No. 608,192; and the object is to dispense with the partition inside, which was necessary in the former construction to keep the oppositely-entering streams from counteracting each other, and to provide a device in which only one bent arm instead of two is used, whereby a lighter and cheaper nozzle is provided and also a more convenient one for portable purposes.

The object is to provide a positive lock to maintain the nozzle in any desired position when the water-pressure is turned off and to simplify and improve the construction in various ways, hereinafter to be fully described and claimed.

We accomplish the objects of the invention by the mechanism illustrated in the accompanying drawings, in which—

Figure 1 is a perspective view of our nozzle attached to a hose and showing in dotted lines the universal adjustment of the nozzle; Fig. 2, a perspective view of our invention attached to a fire-plug; Fig. 3, a detail in longitudinal section of our improved nozzle; Fig. 4, an elevation of same looking in the direction of the arrow, Fig. 3; Fig. 5, a detail in side elevation of a modified construction, and Fig. 6 a second modification showing the supply-pipe passing quite through the head of the nozzle.

Like letters of reference indicate like parts throughout the several views of the drawings.

A is a sleeve having an interally-threaded end to screw upon a corresponding member of the hose or stand-pipe through which the water-supply is to be furnished to the nozzle. Above the thread, or inside and adjacent to it rather, is the flange $a$, upon which the end of the nozzle-pipe B is seated, and opposite the threaded end of the sleeve A is the outside flange $a'$, having a series of bolt-holes. The pipe B is smaller in diameter than the bore of the sleeve A to allow room for packing material between the two. A close-fitting ring C is passed over the end of pipe B, and then a ring $d$ is attached to the end of the pipe by threading the pipe and the ring and screwing the two together and then brazing or soldering them to make a solid and permanent connection. A double pair of bearing-rings $d'$ $d^2$, making a close fit between the sleeve A and the pipe B, are also slipped upon the end of the pipe B before the ring $d$ is made permanent to the end of the pipe B. The contacting faces of the rings $d'$ and $d^2$ are half-round, which we find give better results than the ball-bearings provided for in our former patent, for the reason that the corrosion of the steel balls causes them to stick together and bind in the runs. Between the two pairs of bearing-rings are the packing-rings $d^7$, of any suitable flexible material, which by the pressure of the water against the nozzle will expand to tighten the joint against leakage. The ring C will be bolted by bolts $c$ to the flange $a'$. It will be seen that rotary movement of the pipe B in the sleeve A is provided for by the construction above described. At a suitable distance above the outside ring C to prevent contact with it the pipe B B is bent nearly at right angles, or quite so, and at a distance from the pipe approximating its diameter it is given a return-bend to provide the member B', which stands at right angles to the end B, which enters the sleeve A and terminates approximately at the continuation of the line passing through the longitudinal center of said sleeve A.

Mounted on the end of the member B' is the head E, which has the inside sleeve E', large enough in diameter to receive the end B' and permit of the insertion of a suitable packing between the end and sleeve. The sleeve E' has an inside flange $e$, and the end B' has an outside flange $b$, which contacts with the flange $e$ and regulates the insertion of the end B' into the sleeve. The flange $b$ instead of being formed integral with the end B' in the first instance is made separate and internally screw-threaded, and after the rings to close the joint are assembled on the end B' the ring $b$ is screwed into place and brazed there.

F represents any suitable soft packing, and f the gland, which screws into the threaded end of the sleeve E'. The gland has the outside integral flange f', which is octagonal in outline to permit of its being turned with a wrench to screw it in and out of the sleeve. The head E turns on the end B' as a pivot, and to prevent the unscrewing of the gland by the turning of the head a ring $f^2$ will be introduced between the gland and the packing. The contacting edges of the gland and ring will preferably be rounded to reduce the frictional surface as provided for the rings $d'$ and $d^2$ in the other joint and previously described. The head E will have the threaded outlet $e'$, upon which the nozzle $g$ of usual construction will be screwed.

By the construction as above described it will be noted that the water introduced through the pipe B will be delivered substantially at the middle of the head E inside of it. The curvature of the wall opposite the outlet from the end B' deflects the stream in a direction opposite to the outlet through the nozzle, as well as in the direction of the nozzle and also to each side of the nozzle, and the expanded area of the head around the end B' affords a passage-way around the sides of the end. This construction, as described and shown, we have found by experience to be essential to the construction of a nozzle in which the back pressure is equalized to an extent which causes it to remain stationary and inert in any given position without being held, as is necessary under heavy water-pressure with the ordinary straight nozzle. When the water-pressure is off, the weight of the nozzle will cause the head to swing till the nozzle points down, and to hold it up for the sake of making a better appearance or for any other reason while not in use for throwing water we provide the bracket H from the head E, through which is a screw-threaded opening to receive the set-screw $h$, which screws down against the shoe J, bearing against the end B' of the pipe B. Any desired pressure or friction of the shoe against the end B' can be had by screwing the set-screw in or out. K represents a like bracket taking from the pipe B and having a set-screw $l$ bearing against the shoe L. The shoe L is pressed against the sleeve A by the set-screw. Neither of the two locks just described are required when the water-pressure is on.

In the modification shown in Fig. 5 the enlarged head is dispensed with; but such a construction is only applicable to stand-pipes, where a rigid support is afforded by the pipe to which the nozzle is attached. These nozzles can be pointed to throw a stream in any desired direction in a room and are specially adapted for use in buildings requiring fire protection and are superior to lines of hose because of their more durable nature and also because they can be trained on the fire and left by themselves to continue to throw water upon the place where set.

In the modification shown in Fig. 6 the nozzle-head $E^3$ has openings through both of its walls, through which the end $B^3$ of the supply-pipe is passed. The head has annular depressions around the openings above mentioned to receive the packing-rings $b^7$. The outer end of the pipe $B^3$ is screw-threaded to receive the cap $B^7$, screwing thereon. $B^6$ is a metal ring between the cap $B^7$ and the packing. The pipe has the flange $b^5$, between which and the head $E^3$ the packing-ring on that side of the head is drawn by the cap on the other side of the head. Water issues from the supply-pipe through the openings $p$ in the pipe.

Fig. 1 shows by the dotted lines the universal adjustment of the nozzle and also shows the purpose of the lugs $h\,h$ on opposite sides of the pipe B, which purpose is to support the pipe and keep it on a level with the expanded head E. The nozzle can be attached directly to the fire-plug in the manner shown in Fig. 2 and trained upon the fire, where it will remain until reset.

Having thus fully described our invention, what we claim as new, and wish to secure by Letters Patent of the United States, is—

1. The combination, with a sleeve having connection with a water-supply and a pipe having a turn approximately at right angles and then a double or return bend presenting a portion of the pipe approximately at right angles to the initial part of the pipe, of a head having an inside sleeve reaching to its middle into which said right-angled end of the pipe is inserted, a water-tight packing between the inside sleeve and pipe and a nozzle for the discharge of the water secured to the head, said head being larger in diameter than the inside sleeve and having curved walls, substantially as described and shown.

2. The combination, with a sleeve having connection with a water-supply and a pipe having a turn approximately at right angles and then a double or return bend presenting a portion of the pipe approximately at right angles to the initial part of the pipe, of a head having openings through which said right-angled pipe portion is inserted, a water-tight packing between the head and pipe and a nozzle for the discharge of the water, secured to the head said head being larger in diameter than the pipe and having curved walls, substantially as described and shown.

3. The combination, with a sleeve having communication with a water-supply and a pipe connected by a swivel-joint with the sleeve and having the end of the pipe opposite the joint bent to terminate at right angles with the end at the joint and having an outside flange, a nozzle having a head with an inside sleeve, said inside sleeve having an inside flange at its inner end and screw-threads at its outer end, a gland screwing into the threaded end of the inside sleeve, a bearing-ring adjacent to the gland inside, and a compressible packing-ring to pack the joint, substantially as described and specified.

4. The combination, of a pipe having a lateral bend and a return-bend to make lines projected through the axes of the bent and straight ends of the pipe intersect at right angles, the bent end of the pipe terminating approximately over the axial center of the opposite straight end, a sleeve in which the straight end of the pipe is seated having an inside flange, an inside thread below the flange, an outside flange at the outer end of the sleeve, two pairs of bearing-rings between the pipe and the sleeve, said rings having rounded contacting faces and the lower of said rings being permanently secured to the end of the pipe after the parts of the joint are assembled, a collar bolted to the outside flange of the sleeve, a compressible packing between the bearing-rings and a head having a nozzle extension adjustably mounted, as described, on the bent pipe end, substantially as specified.

5. In a stand-pipe, a sleeve having an inside shoulder, an inner section of said pipe resting on said inside shoulder, an outside ring or flange secured to the end of the inner section of pipe, a bearing-ring above the flange-ring having rounded contacting faces, a second ring above the flange separated therefrom by a compressible packing, a compressible packing, a third ring from the flange having a bearing against the second ring and both rings having rounded contacting faces and a collar bolted to the outside section, substantially as described.

In witness whereof we have hereunto set our hands and seals, at Indianapolis, Indiana, this 3d day of October, A. D. 1900.

JOHN T. GLAZIER. [L. S.]
PETER F. GLAZIER. [L. S.]

Witnesses:
JOSEPH A. MINTURN,
CHARLES C. GLAZIER.